Aug. 19, 1930.   C. V. BROWN   1,773,569
DISK WHEEL
Filed Jan. 11, 1929
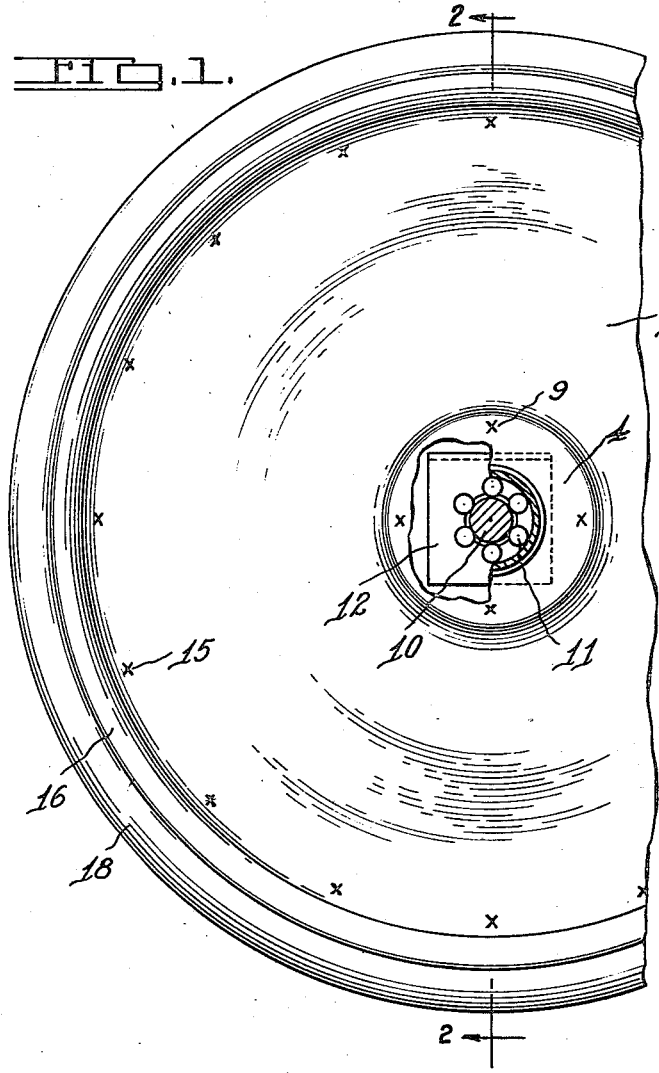
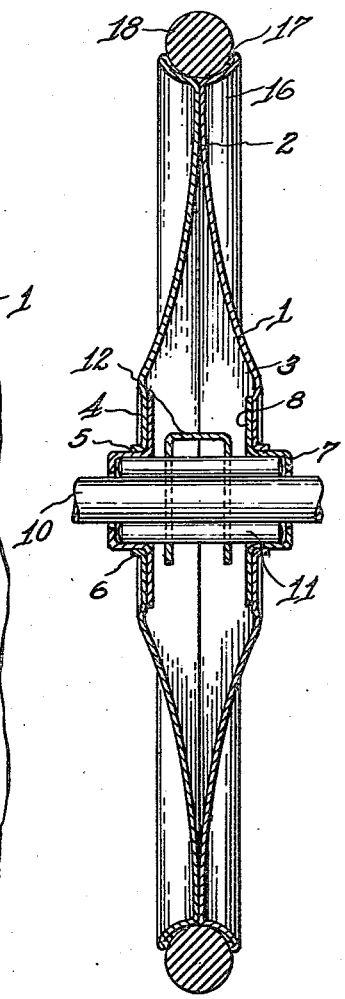
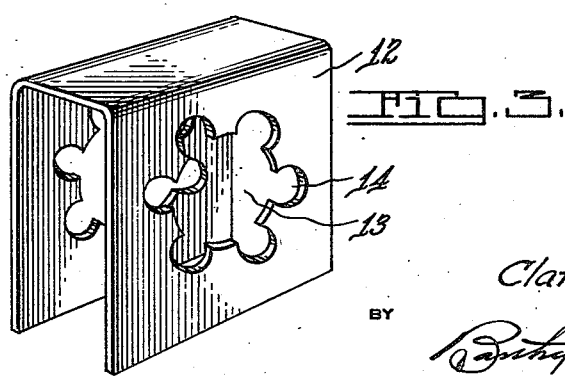
INVENTOR
Clarence V. Brown,
BY
ATTORNEYS Patented Aug. 19, 1930

1,773,569

UNITED STATES PATENT OFFICE

CLARENCE V. BROWN, OF YPSILANTI, MICHIGAN, ASSIGNOR TO U. S. PRESSED STEEL COMPANY, OF YPSILANTI, MICHIGAN, A CORPORATION OF MICHIGAN

DISK WHEEL

Application filed January 11, 1929. Serial No. 331,751.

The present invention pertains to a novel metal disk wheel suitable for various uses as on vehicles, toy carts and wheeled toys in general.

The principal object of the invention is to provide a wheel construction of this character having the bearings assembled therein in such a manner that they will not fall out of position even though there is no axle inserted in the wheel. Due to this construction, the wheel may be shipped with the bearings inserted in place but without an axle or a stub shaft, and convenience in shipping and handling is thus made possible. One of the particular objects of the invention is to provide a small size wheel resembling an automobile wheel with a balloon tire and further formed in such a manner as to avoid cutting the solid tire mounted thereon.

The invention further provides a novel hub assembly for supporting and retaining roller bearings which rotate around the axle passing through the hub.

The invention is fully disclosed by way of example in the following description and in the accompanying drawing, in which—

Figure 1 is a fragmentary side elevation of the wheel, partly in section;

Fig. 2 is a diametric section on the line 2—2 of Figure 1; and

Fig. 3 is a perspective view of the bearing retainer.

Reference to these views will now be made by use of like characters which are employed to designate corresponding parts throughout.

The body of the wheel is comprised of a pair of like disks 1 of suitable sheet metal, in contact with each other at 2 near the outer edges thereof and diverging as at 3 towards their central portions. The central portions are however flat as at 4 and formed with aligned openings 5 surrounded each by a flange 6 extending outwardly from the flat center 4. Hub sections 7 of cup formation are fitted into the openings 5 and formed each with a base flange 8 engaging the inner surface of the corresponding flat center 4 and welded thereto at the points 9.

The axle 10 on which the wheel is mounted passes through the hub members and is surrounded by a series of roller bearings 11 having their ends received in the members 7. In the center of the wheel, between the flat central portions 4, is provided a retainer consisting of a sheet of metal 12 bent to a U-shape as clearly shown in Figures 2 and 3. In each of the sides of this member is formed, as by stamping, a substantially circular opening 13 and a circular series of smaller openings 14 around the same and in communication therewith. The axle 10 passes through the larger openings 13, and the roller bearings 11 are accommodated in the smaller openings 14. The latter are equally spaced and the member 12 thus serves as a retainer and spacer for the several roller bearings. It will be seen that the apertures 14 have an extent of more than 180° circumferentially on the outside of the circumference of the opening 13. Thus, the bearings 11 slipped into the apertures 14 cannot fall into the larger opening 13 even though there be no axle in the latter. The end caps 7 prevent the bearings from shifting longitudinally, and as the result of this construction, the wheel with the bearings assembled therein may be shipped and handled without displacing the bearings from their correct position.

Where the plates 1 are in mutual engagement as designated by the numeral 2, they are spot-welded together at the points 15. The marginal portions of the plates are curved outwardly and arcuately through an extent of substantially 90° to form rim sections 16. These sections taken together constitute a channel rim as is evident by an inspection of Figure 2. The extreme edges of the plates are bent inwardly into the channel as at 17, thereby reinforcing the latter and presenting a blunt edge to the solid rubber tire 18 fitted into the channel, so that there is no danger of this tire being cut by the metal structure.

Although a specific embodiment of the invention has been illustrated and described, it will be understood that various alterations in the details of construction may be made without departing from the scope of the invention as indicated by the appended claims.

What I claim is:—

1. A retaining and spacing member for the bearings of a wheel axle, said member having a central opening adapted to receive an axle and having a series of circular apertures adapted to receive roller bearings formed around said opening and communicating therewith, said apertures being larger than semi-circles.

2. A bearing retainer comprising a U-shaped metallic member having in each side thereof a circular opening and a series of circular apertures formed around said opening and communicating therewith, each of said apertures being larger than the semi-circle, the opening and apertures of each side being respectively co-axial with the corresponding formations in the other side.

In testimony whereof I affix my signature
CLARENCE V. BROWN.